US 8,627,203 B2

(12) United States Patent
Chang et al.

(10) Patent No.: US 8,627,203 B2
(45) Date of Patent: Jan. 7, 2014

(54) METHOD AND APPARATUS FOR CAPTURING, ANALYZING, AND CONVERTING SCRIPTS

(75) Inventors: Walter Chang, San Jose, CA (US); Michael J. Welch, Los Angeles, CA (US)

(73) Assignee: Adobe Systems Incorporated, San Jose, CA (US)

(*) Notice: Subject to any disclaimer, the term of this patent is extended or adjusted under 35 U.S.C. 154(b) by 297 days.

(21) Appl. No.: 12/713,008

(22) Filed: Feb. 25, 2010

(65) Prior Publication Data

US 2013/0124979 A1    May 16, 2013

(51) Int. Cl.
*G06F 17/27* (2006.01)
(52) U.S. Cl.
USPC ............................ 715/243; 715/244; 715/255
(58) Field of Classification Search
USPC .......................................... 715/243, 244, 255
See application file for complete search history.

(56) References Cited

U.S. PATENT DOCUMENTS

| | | | |
|---|---|---|---|
| 5,596,705 A | | 1/1997 | Reimer et al. |
| 6,105,045 A | * | 8/2000 | Kurabayashi et al. ........ 715/201 |
| 7,849,081 B1 | | 12/2010 | Chang |
| 8,090,724 B1 | | 1/2012 | Welch |
| 8,209,600 B1 | | 6/2012 | Koh |
| 2002/0099499 A1 | | 7/2002 | Takayama et al. |
| 2004/0139384 A1 | * | 7/2004 | Lin ................................ 715/500 |
| 2007/0154190 A1 | | 7/2007 | Gilley et al. |
| 2008/0243820 A1 | | 10/2008 | Chang |
| 2008/0281805 A1 | | 11/2008 | Xiaolu et al. |

FOREIGN PATENT DOCUMENTS

WO    WO 03/098370 A2 *  11/2003

OTHER PUBLICATIONS

Screenplay Formatting; 2003; Scriptologist.com; pp. 1-5.*
Finite State Machine; Mar. 24, 1998; TechTarget.com, p. 1.*
U.S. Appl. No. 11/728,069, filed Mar. 23, 2007, 33 pages.
U.S. Appl. No. 11/946,637, filed Nov. 28, 2007, 46 pages.
U.S. Appl. No. 11/946,671, filed Nov. 28, 2007, 50 pages.
U.S. Appl. No. 12/471,814, filed May 26, 2009, 54 pages.

* cited by examiner

*Primary Examiner* — Andrew Dyer
(74) *Attorney, Agent, or Firm* — Wolfe-SBMC

(57) ABSTRACT

Methods and apparatus for capturing, analyzing, and converting documents are provided. Provided in some embodiments is a method that includes obtaining a script document comprising script elements, assessing a layout of the script document, wherein the layout comprises a physical location of the script elements within the script document, determining an identification of one or more of the script elements based at least in part on the physical location of the one or more script elements within the script document, and assessing the one of the script elements using a finite state machine, wherein the finite state machine assesses one or more of the script elements preceding or following the one of the script elements to determine an accuracy of the identification of the one or more of the script elements determined.

20 Claims, 11 Drawing Sheets

```
----------------------------------------------------------------
Script processed as Spec. Script
Script start element: Valid
Text lines processed= 6288
StartLine,LeftMargin= 46,5
----------------------------------------------------------------
Script Files:
Input : D:\AdobeWork\files\WhoFramedRogerRabbit.txt
Output: D:\AdobeWork\files\WhoFramedRogerRabbit.ast STATISTICS
----------------------------------------------------------------
Scene Types:
     EXTerior Scenes =    29
     INTerior Scenes =    36
     INT/EXT  Scenes =     0
     Untyped  Scenes =     0

Other Element Types:
     SHOTs           =     4
     Transitions     =    17
     Actions         =  1811
     Character Items =   757
     Dialog Items    =  1419
     Parentheticals  =   227

Syntax Warnings:
     Character names =     1   Mixed upper/lower case
     Bad Formatting  =     0   Indenting problems
     Scene Typing    =     0   Missing INT. / EXT.
     Shot Ambiguity  =     0   Missing SHOT keyword Execution Time (in sec.):
     Preprocessing  = 0.297
     Parse/Convert  = 0.766
     Total Run Time = 1.063
----------------------------------------------------------------

Sedona2 - Completed script parsing and conversion.
```

*FIG. 4B*

FADE IN:

INT. JUSTIN'S ROOM - DAY

JUSTIN SUTTER, 18, lies sideways and comatose in bed at well past ten in the morning.

The sound of chirping birds outside is interrupted by the roar of a vacuum as it bursts into the room like a one-eyed alien robot. MRS. SUTTER shouts over the noise.

MRS. SUTTER
  Justin! Get up.

Justin groans and pulls a pillow tightly over his face.

MRS. SUTTER
  Is something kinky going on in
  here, buster?

Justin rolls away as his mother hovers over him.

MRS. SUTTER
  You've slept long enough, lazy
  bones.

JUSTIN
  Mom! What the hell?

MRS. SUTTER
  You better watch your mouth, young
  man. No wonder you're flunking
  English with speech like that.

Mrs. Sutter clicks off the vacuum.

JUSTIN
  Ahh, thank god.

MRS. SUTTER
  Did you hear what I said? You're
  flunking English. Your teacher just
  called me.

JUSTIN
  Mr. Weiss called here? You talked
  to him?

MRS. SUTTER
  You're failing his class. You need
  it to graduate.

She tosses a folded piece of paper onto Justin's lap. He stares at it. A sad look comes across her face.

FIG. 6

602a        606a                                                      122a
                                      ATT_The_Son
"The Son"/ Generic Hollywood spec. Movie script parser/converter to Adobe Story Format
copyright (c) 2008-2009. Adobe Systems, Inc.
version information: 1.0.
600a  Main_proxy: goldman-fiST_output_format:astx
       00008  TRAN   [FADE IN:]  ⟵――― 604a
       00010  SCEN   [INT. JUSTIN'S ROOM – DAY]
       00012  ACTN   [JUSTIN SUTTER, 18, lies sideways and comatose in bed at well]
       00013  ACTN   [past ten in the morning.]
       00015  ACTN   [The sound of chirping birds outside is interrupted by the]
       00016  ACTN   [roar of a vacuum as it bursts into the room like a one-eyed]
       00017  ACTN   [alien robot. MRS. SUTTER shouts over the noise.]
       00019  CHAR   [MRS. SUTTER]
       00020  DIAG   [Justin! Get up.]
       00022  ACTN   [Justin groans and pulls a pillow tightly over his face.]
       00024  CHAR   [MRS. SUTTER]
       00025  DIAG   [Is something kinky going on in]
       00026  DIAG   [here, buster?]
       00028  ACTN   [Justin rolls away as his mother hovers over him.]
       00030  CHAR   [MRS. SUTTER]
       00031  DIAG   [You've slept long enough, lazy]
       00032  DIAG   [bones.]
       00034  CHAR   [JUSTIN]
       00035  DIAG   [Mom! What the hell?]
       00037  CHAR   [MRS. SUTTER]
       00038  DIAG   [You better watch your mouth, young]
       00039  DIAG   [man. No wonder you're flunking]
       00040  DIAG   [English with speech like that.]
       00042  ACTN   [Mrs. Sutter clicks off the vacuum.]
       00044  CHAR   [JUSTIN]
       00045  DIAG   [Ahh, thank god.]
       00047  CHAR   [MRS. SUTTER]
       00048  DIAG   [Did you hear what I said? You're]
       00049  DIAG   [flunking English. Your teacher just]
       00050  DIAG   [called me.]
       00052  CHAR   [JUSTIN]
       00053  DIAG   [Mr. Weiss called here? You talked]
       00054  DIAG   [to him?]
       00056  CHAR   [MRS. SUTTER]
       00057  DIAG   [You're failing his class. You need]
       00058  DIAG   [it to graduate.]
       00060  ACTN   [She tosses a folded piece of paper onto Justin's lap. He]
       00061  ACTN   [stares at it. A sad look comes across her face.]

*FIG. 7A*

```xml
<?xml version="1.0" encoding="utf-8"?>
- <AdobeStory version="1.0.0" documentType="script" template-"Film">
  - <document version="11">
    - <stream objID="1:1" name="body">
    - <section objID="1:2">
    - <scene objIS="1:3">
      + <paragraph objID="1:4" element="Transaction">
      </scene>
    - <scene objID="1:6">
      - <paragraph objID="1:7" element="SceneHeading">
        <textRun objID="1:8">INT. JUSTIN'S ROOM – DAY</textRun>
      </paragraph>
      - <paragraph objID="1:9" element="Action">
        <textRun objID="1:10">JUSTIN SUTTER, 18, lies sideways and comatose in bed at well past ten in the morning.</textRun>
      </paragraph>
      - <paragraph objID="1:11" element="Action">
        <textRun objID="1:12">The sound of chirping birds outside is interrupted by the roar of a vacuum as it bursts into the room like a one-eyed alien robot. MRS. SUTTER shouts over the noise.</textRun>
      </paragraph>
      - <paragraph objID="1:13" element="Character">
        <textRun objID="1:14">MRS. SUTTER</textRun>
      </paragraph>
      - <paragraph objID="1:15" element="Dialog">
        <textRun objID="1:16">Justin! Get up.</textRun>
      </paragraph>
      - <paragraph objID="1:17" element="Action">
        <textRun objID="1:18">Justin groans and pulls a pillow tightly over his face</textRun>
      </paragraph>
      - <paragraph objID="1:19" element="Character">
        <textRun objID="1:20">MRS. SUTTER</textRun>
      </paragraph>
      - <paragraph objID="1:21" element="Dialog">
        <textRun objID="1:22">Is something kinky going on in here, buster?</textRun>
      </paragraph>
      - <paragraph objID="1:23" element="Action">
        <textRun objID="1:24">Justin rolls away as his mother hovers over him.</textRun>
      </paragraph>
      - <paragraph objID="1:25" element="Character">
        <textRun objID="1:26">MRS. SUTTER</textRun>
      </paragraph>
      - <paragraph objID="1:27" element="Dialog">
        <textRun objID="1:28">You've slept long enough, lazy bones.</textRun>
```

```
      </paragraph>
    - <paragraph objID="1:29" element="Character">
        <textRun objID="1:30">JUSTIN</textRun>
      </paragraph>
    - <paragraph objID="1:31" element="Dialog">
        <textRun objID="1:32">Mom! What the hell?</textRun>
      </paragraph>
    - <paragraph objID="1:33" element="Character">
        <textRun objID="1:34">MRS. SUTTER</textRun>
      </paragraph>
    - <paragraph objID="1:35" element="Dialog">
        <textRun objID="1:36">You better watch your mouth, young man. No
wonder you're flunking English with speect like that.</textRun>
      </paragraph>
    - <paragraph objID="1:37" element="Action">
        <textRun objID="1:38">Mrs. Sutter clicks off the vacuum.</textRun>
      </paragraph>
    - <paragraph objID="1:39" element="Character">
        <textRun objID="1:40">JUSTIN</textRun>
      </paragraph>
    - <paragraph objID="1:41" element="Dialog">
        <textRun objID="1:42">Ahh, thank god.</textRun>
      </paragraph>
    - <paragraph objID="1:43" element="Character">
        <textRun objID="1:44">MRS. SUTTER</textRun>
      </paragraph>
    - <paragraph objID="1:45" element="Dialog">
        <textRun objID="1:46">Did you hear what I said? You're flunking English.
Your teacher just called me.</textRun>
      </paragraph>
    - <paragraph objID="1:47" element="Character">
        <textRun objID="1:48">JUSTIN</textRun>
      </paragraph>
    - <paragraph objID="1:49" element="Dialog">
        <textRun objID="1:50">Mr. Weiss called here? You talked to him?</textRun>
      </paragraph>
    - <paragraph objID="1:51" element="Character">
        <textRun objID="1:52">MRS. SUTTER</textRun>
      </paragraph>
    - <paragraph objID="1:53" element="Dialog">
        <textRun objID="1:54">You're failing his class. You need it to graduate</
textRun>
      </paragraph>
    - <paragraph objID="1:55" element="Action">
        <textRun objID="1:56">She tosses a folded piece of paper onto Justin's lap.
He stares at it. A sad look comes across her face.</textRun>
      </paragraph>
```

*FIG. 7B CONT.*

METHOD AND APPARATUS FOR CAPTURING, ANALYZING, AND CONVERTING SCRIPTS

BACKGROUND

Description of the Related Art

Documents are generally formatted according to some layout pattern, whether the pattern is a simple block format or a more complex multi-column format. In many documents, metadata may be indicated by the document layout pattern. For example, the title of a document is typically located at the beginning of a document, and is typically presented in the center and top of the page. As another example, page number and publisher information is often presented in the center bottom of the page or in the top left or right corner of the page. The layout of a document may thus provide features that are indicate useful metadata information related to elements of the document.

As an example of a document format including features indicative of metadata, movie scripts often abide by a script layout format that is recognized as a film industry standard. The standard has evolved over decades in the industry, and has generally become a universal standard script format for writers in the film medium worldwide, from short dramas through feature-length films. Movie scripts typically conform to format requirements according to the evolved standard such as "There should be 2× returns between Scene Description and Dialogue (and vice versa)" and "Dialogue should be indented (tabbed but not centered) so that accurate script timings can be made." By using these standard or similar variations of the standard, it is straightforward for a person viewing the document, for example, to identify scene descriptions and dialogues from movie scripts. Although some scripts vary from standard script formatting, they are typically formatted consistent throughout the respective document such that similar elements share certain features with one another.

It is often desirable to identify discrete elements of the script, such as scene headings, action elements, character names, parenthetical, transitions, shot elements, and the like. Identification of the discrete elements of a script may enable a user to extract various elements of the script without having to search through the entire document. Unfortunately, identifying each of the elements may require a considerable amount of time and effort, especially where a script document is quire large and there is variation from standard script formatting.

Accordingly, it is desirable to provide a technique for automatically identifying and extracting document elements.

SUMMARY

Various embodiments of methods and apparatus for identifying and/or extracting elements of documents are described. Provided in some embodiments is a computer-implemented method that includes obtaining a script document comprising script elements, assessing a layout of the script document, wherein the layout comprises a physical location of the script elements within the script document, determining an identification of one or more of the script elements based at least in part on the physical location of the one or more script elements within the script document, and assessing the one of the script elements using a finite state machine, wherein the finite state machine assesses one or more of the script elements preceding or following the one of the script elements to determine an accuracy of the identification of the one or more of the script elements determined.

In some embodiments computer-readable storage medium includes program instructions stored thereon that are computer-executable to implement: obtaining a script document comprising script elements, assessing a layout of the script document, wherein the layout comprises a physical location of the script elements within the script document, determining an identification of one or more of the script elements based at least in part on the physical location of the one or more script elements within the script document, and assessing the one of the script elements using a finite state machine, wherein the finite state machine assesses one or more of the script elements preceding or following the one of the script elements to determine an accuracy of the identification of the one or more of the script elements determined.

In certain embodiments, a computer-implemented method includes obtaining a document comprising elements, assessing a layout of the document, wherein the layout comprises a physical location of the elements within the document, determining an identification of one or more of the script elements based at least in part on the physical location of the one or more elements within the document, and assessing the one of the elements using a finite state machine, wherein the finite state machine assesses elements preceding or following the one of the elements to determine an accuracy of the identification of the one or more of the elements.

BRIEF DESCRIPTION OF THE DRAWINGS

FIGS. 4A and 4B are charts that illustrate exemplary outputs of a statistical analysis of a script document in accordance with one or more embodiments of the present technique.

FIG. 6 is a depiction of an exemplary script document in accordance with one or more embodiments of the present technique.

FIGS. 7A and 7B are depictions of exemplary tagged/structured script document output in accordance with one or more embodiments of the present technique.

Figure 1:
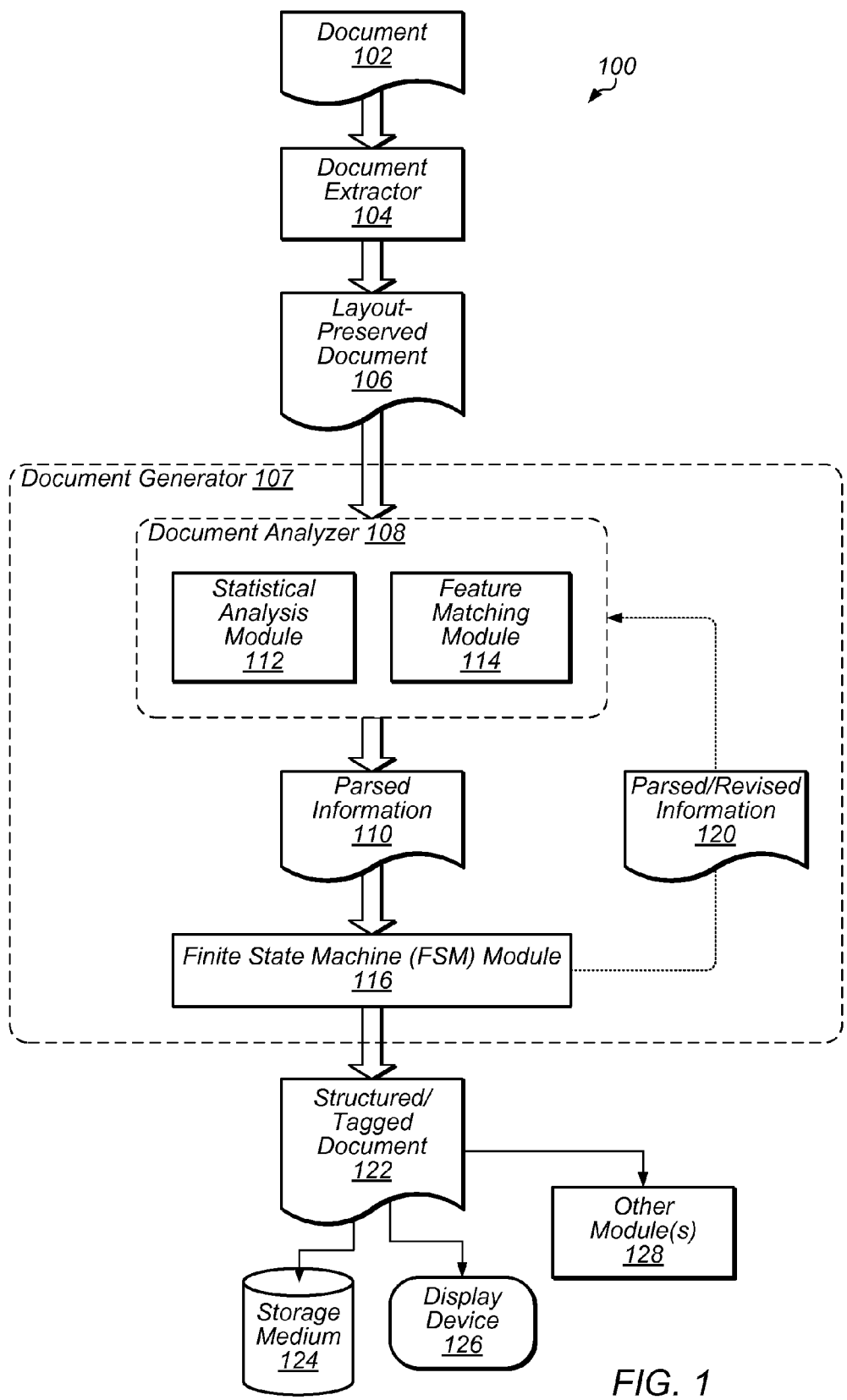
FIG. 1 is a block diagram that illustrates components of and dataflow in a document element identification/extraction method in accordance with one or more embodiments of the present technique.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for capturing, analyzing, and converting documents are provided. In some embodiments, a document includes a script document, such as a movie or speculative script that outlines visual, audio, behavioral, and spoken elements required to tell a story. In certain embodiments, a script document is extracted into a layout-preserved format, such that features such as spacing and indentation can be extracted from the layout-preserved document. In some embodiments, the layout preserved document is provided to a document generator that is capable of assessing/processing the layout-preserved document to produce a structured/tagged document. In some embodiments, the document generator used to process the layout-preserved document implements a combination of statistical analysis, feature matching and finite state machine (FSM) analysis to assess and determine the tags of document elements that are ultimately identified in the structured/tagged document. In certain embodiments, features may be initially identified via statistical analysis and feature matching, and processing by the FSM is used to analyze the sequence of the identified elements to assess/determine/verify element identifiers for each of the lines/elements. In some embodiments, the resulting structured/tagged document may include a sequential listing of the lines of the document in accordance with their order in the original document along with a tag (e.g., "TRAN", "ACTN", "CHAR", "DIAG", "PARN" or the like) identifying a determined element type associated with each line. In certain embodiments, the structured/tagged document may be associated with other documents, such as a time-aligned with corresponding video based on the script such that dialog text within the script is synchronized to the audio dialog portion of the video content.

While embodiments are described as being applied to the extraction of metadata from script documents, embodiments may be adapted for use with other document formats including various layouts and features that can be used to identify elements within the document. In addition, while embodiments are described as being applied to the extraction of textual elements from documents, embodiments may be adapted for use in extracting document elements other than textual elements.

FIG. 1 is a block diagram that illustrates components of and dataflow in a document element identification/extraction method 100 in accordance with one or more embodiments of the present technique. In the illustrated embodiment, a document 102 (e.g., a script) is provided to a document extractor 104. Document extractor 104 may include a layout-preserved text generator that extracts data, including layout information, from document 102 and provides a corresponding layout-preserved document 106. Layout preserved document 106 may be provided to a document analyzer 108 of a document generator 107. Document analyzer 108 may process layout-preserved document 106 to provide a corresponding parsed document 110.

In some embodiments, document generator 107, or another component, may provide for pre-processing of layout preserved document 106. For example, where layout preserved document 106 includes a certain type of script document (e.g., closed caption script document), document generator 107 may include a pre-processing module for modifying layout preserved document 106 (e.g., identifies/filters/extracts certain portions of document 106) such that it can be processed using the techniques described herein.

In some embodiments, document analyzer 108 may include one, or both, of a statistical analysis module 112 and a feature identification module 114. In some embodiment, statistical analysis module 112 and feature identification module 114 may be separate or integrated modules for performing feature identification. Statistical analysis module 108 may process layout-preserved document 106 to build a statistical model of a layout of layout-preserved document 106. Feature matching module 110 may invoke various techniques, such as matching, to assess and determine how to interpret/identify each element contained in layout preserved document 106. Document analyzer 108 may use the information derived from statistical analysis module 112 and/or feature identification module 114 to tokenize each line such that each line is associated with an element identifier (e.g., scene heading, action element, character name, parenthetical, transition, shot element, etc.). For example, document analyzer may apply features identified for a particular line of the document via matching by feature matching module 114 to a similar grouping of lines identified in statistical analysis module 112, such that similarly formatted lines share the same element identifier.

Document analyzer may provide a parsed document (or parsed information) 110 that include results of the tokenization, including, for example, a structured document (or set of information) that includes at least a sequential listing of the element identifiers in association with their relative locations in the layout of document 102. For example, parsed information 110 may include a set of information (e.g., a document) listing of each line of document 102 in the same sequence they were presented in document 102, along with a tag/heading for each line. Parsed information 110 may, then, be forwarded to finite state machine module (FSM) 116 for further processing. In some embodiments, FSM 116 includes a model of possible transitions between states. For example, FSM 116 may indicate only a finite number of possible transitions from a current state to one or more subsequent states, or to the current state from one or more preceding states. In some embodiments, FSM 116 may include a model of acceptable transitions Thus, FSM 116 may analyze the sequence of the identified elements in parsed information 110 to assess/determine/verify element identifiers for each of the lines/elements in parsed document 110. In some embodiments, FSM 116 may assess/determine/verify an element identifier assigned to a particular line/element based on one or more of the element identifiers assigned to lines/elements preceding and/or following the particular line/element being assessed. In other words, FSM 116 may process the context of a line/element using a state machine to assess whether or not the element identifier of parsed information 110 appears to be accurate (e.g., correct), or appears to be inaccurate (e.g., incorrect) based on its position relative to other identifier elements. For example, where FSM 116 provides for a valid/expected transition from a dialog state to a character state (see, for example FIG. 5 including a direct transition (18) from dialog state to character state), a "dialog element" identified immediately after a "character name" element is likely correct and is verified. However, where FSM 116 does not provide for a valid/expected transition from a dialog state to a scene state (see, for example FIG. 5, where no direct transition is present between a scene state and a dialog state), a "dialog element" identified immediately after a "scene heading" is likely incorrect and may be reassessed. FSM 116 may repeat assessment for each line/element to determine which elements in parsed information 110 are accurate. In some embodiments, FSM 116 may confirm the element identifier assigned in parsed information 110, may determine that certain element identifiers might be incorrect/inaccurate and may need to be reassessed, or determine that an element identifier is incorrect/inaccurate and change the identifier. Where FSM 116 determines that one or more identifiers need to be reassessed, FSM 116 may forward a set of parsed/revised information 120 to document analyzer for additional processing. Where FSM 116 determines that an element identifier is in incorrect/inaccurate, FSM 116 may assign an accurate element identifier to the respective line/element and/or may forward a set of parsed/revised information 120 to document analyzer 108 for additional processing.

Cycling through FSM 116 and document analyzer 108 may be repeated for one or more iteration until it is determined that each of the assigned element identifiers are correct/accurate. For example, the information may be assessed until the FSM determines that no additional changes to the element identifiers need to be made (e.g., all of the element identifiers appear to be correct). Accordingly, information associated with a structured document that includes at least a sequential listing of the element identifiers in association with their relative locations in the layout of document 102 may pass through multiple iterations until each of the element identifiers is verified. Once processing of layout preserved document 106 is complete, a structured/tagged document 116 may be generated. Structured/tagged document 122 may include a standard structured format including element identifiers (e.g., tags) for each line/element of document 116. In some embodiments, structured/tagged document may include an Extensible Markup Language (XML) format or Extensible Telephony Markup Language (XTML) format, such as *.ASTX format used by certain products produced by ADOBE Systems. As discussed in more detail below with respect to FIG. 8, structured/tagged document 122 may include a sequential listing of the lines of the document that is the same as their order in document 102, along with a tag identifying the determined element type associated with each line. Structured/tagged document 122 may be stored on a storage medium 124 (e.g., including the script elements extracted to a script metadata database), provided to a display device 126 for presentation to a user, and/or provided to one or more other modules 128 for additional processing. As discussed in more detail below, structured/tagged document 122 may be associated/processed with other documents, such as a time-aligned with corresponding video based on the script such that dialog text within the script is synchronized to the audio dialog portion of the video content.

Figure 2:
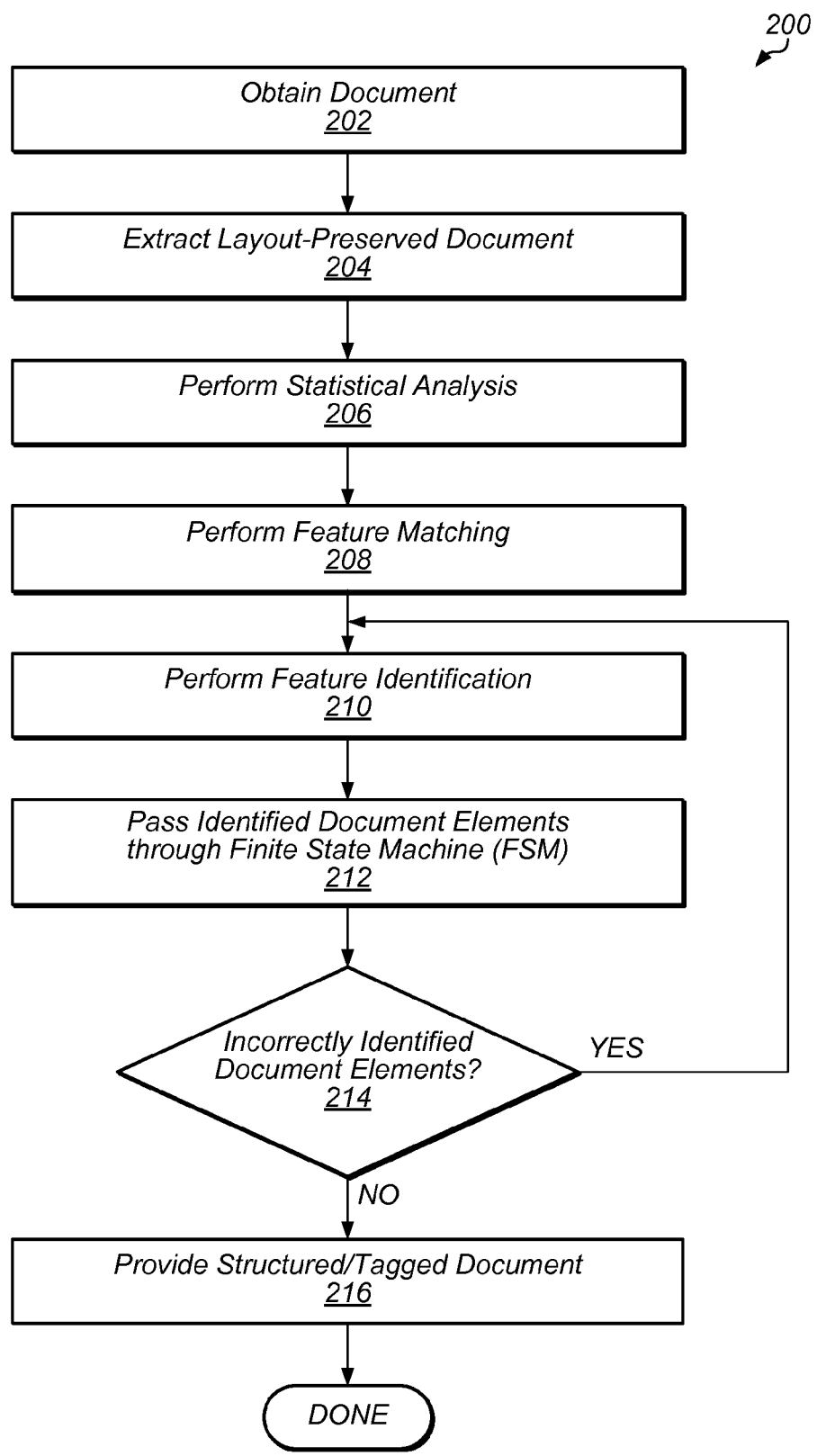
FIG. 2 is a flowchart that illustrates a document element identification/extraction method in accordance with one or more embodiments of the present technique.

FIG. 2 is a flowchart that illustrates a document element identification/extraction method 200 according to one or more embodiments of the present technique. In the illustrated embodiment, method 200 generally includes obtaining a document, extracting a layout preserved version of the document, performing a statistical analysis and/or feature matching of features contained within the document, identifying document elements based on the statistical analysis and/or the feature matching, passing the identified document elements through a finite state machine to assess/determine/verify the identified document elements, assessing whether or not document elements are incorrectly identified, and, if it is determined that there are incorrectly identified document elements, re-performing at least a portion of the identification steps, or, if it is determined that there are no (or sufficiently few) incorrectly identified document elements, generating/storing/outputting a structured/tagged document.

In some embodiments, method 200 includes obtaining a document as depicted at block 202. Obtaining a document may include receiving a hard copy or an electronic copy of a document 102, for instance. Receiving a hard-copy of a document may include receiving one or more physical pages of a document having one or more document elements (e.g., script elements) printed thereon. For example, an older script document (e.g., a legacy script) may be available only in a printed hard copy consisting of a plurality of script pages. In the case of receiving a hard copy of a document, the hard-copy may be transformed into an electronic format that is capable of being stored and processed on a computing device. For example, in some embodiments, obtaining a script document may include scanning, or otherwise processing, one or more pages of the physical document into a electronic format, such as POR- TABLE DOCUMENT FORMAT (PDF) (by ADOBE Systems headquartered in San Jose, Calif.) or another image format (e.g., a Joint Photographic Experts Group (JPEG), a Tagged Image File Format (TIFF), a bitmap (BMP), or the like). In some embodiment, obtaining a document may include receiving a document/file in an electronic format, such as a PDF format, a MICROSOFT WORD Document format (by MICROSOFT Corporation, headquartered in Redmond, Wash.), an HTML document format, image formats, or the like. As described in more detail below, electronic documents may be suitable for extracting a layout-preserved document 106 that can be further processed by system 100.

In some embodiments, document 102 may include a script document, such as a movie script (e.g., a Hollywood script), a speculative script, a shooting script (e.g., a Hollywood shooting script), a closed caption (SRT) video transcript or the like. A movie script may include a document that outlines all of the visual, audio, behavioral, and spoken elements required to tell a story. A speculative ("spec") script or screenplay may include a preliminary script used in both film and television industries. A spec script for film generally includes an original screenplay and may be a unique plot idea, an adaptation of a book, or a sequel to an existing movie. A "television" spec script is typically written for an existing show using characters and storylines that have already been established. A "pilot" spec script typically includes an original idea for a new show. A television spec script is typically 20-30 pages for a half hour of programming, 40-60 pages for a full hour of programming, or 80-120 pages for two hours of programming. It will be appreciated that once a spec script is purchased, it may undergo a series of complete rewrites or edits before it is put into production. Once in "production", the script may evolve into a "Shooting Script" or "Production Script" having a more complex format. Numerous scripts exist and new scripts are continually created and sold.

Since film production is a highly collaborative process, the director, cast, editors, and production crew may use various forms of the script to interpret the underlying story during the production process. Further, since numerous individuals are involved in the making of a film, it is generally desirable that a script conform to specific standards and conventions that all involved parties understand (e.g., it will use a specific format w.r.t. layout, margins, notation, and other production conventions). Thus, a script document is intended to structure all of the script elements used in a screenplay into a consistent layout.

Scripts generally include script elements embedded in the script document. Script elements often include a title, author name(s), scene headings, action elements, character names, parentheticals, transitions, shot elements, and the like. Titles and author name(s) are typically listed at the beginning of the document. The title and author name(s) are often centered at the head/start of the document with the author name(s) located below the title, and with one or more blank lines between the two.

Figure 3:
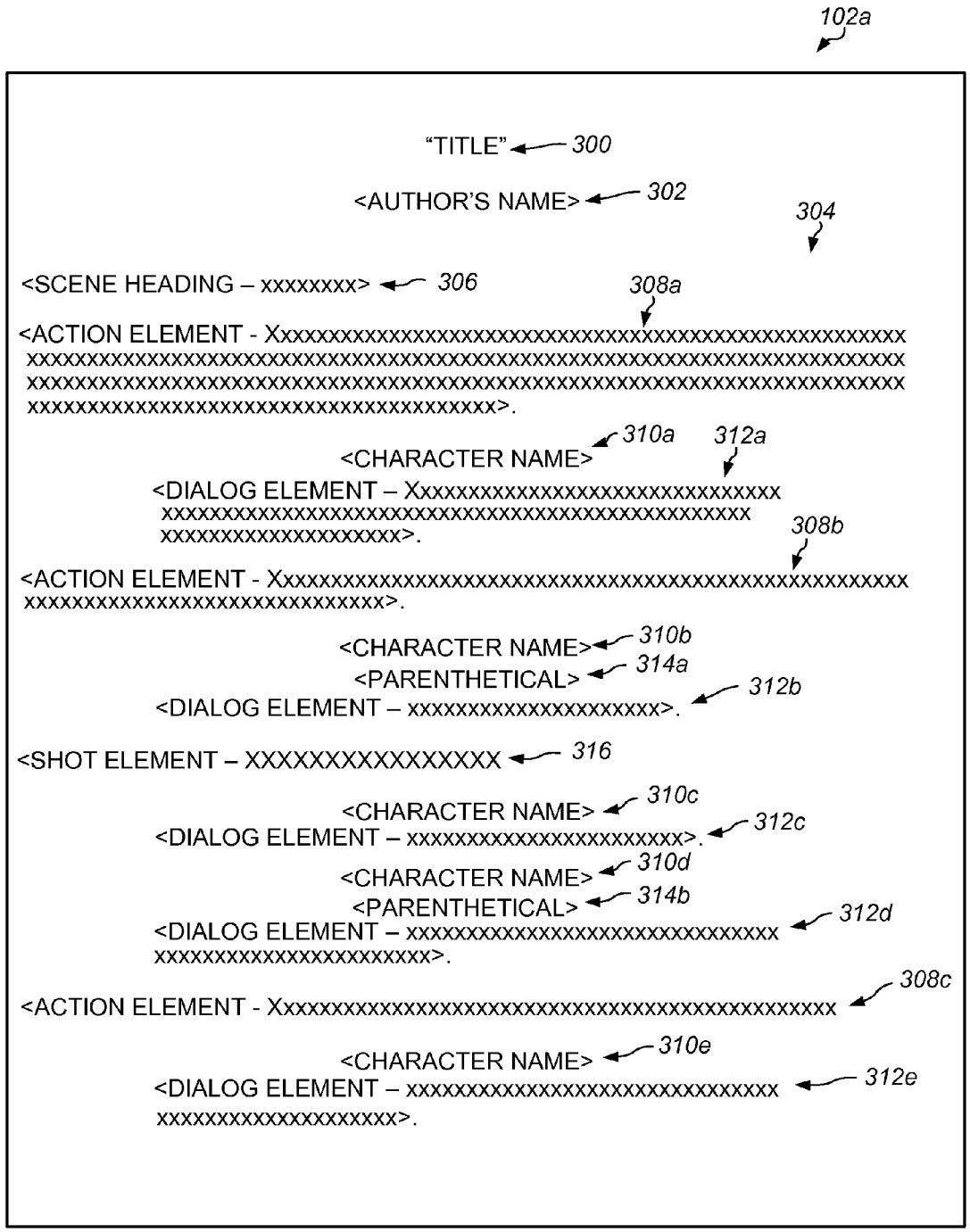
FIG. 3 is an illustration of an exemplary script document in accordance with one or more embodiments of the present technique.

FIG. 3 illustrates an exemplary script document 102a in accordance with one or more embodiments of the present technique. Exemplary script document 102a depicts an exemplary layout of the above described script elements. For example, exemplary script document 102a includes a representation of a title element 300, an author name element 302, a transition element 304, a scene heading element 306, action elements 308a, 308b and 308c, character name elements 310a, 310b, 310c, 310d, and 310e, dialog elements 312a, 312b, 312c, 312d, and 312e, parenthetical elements 314a and 314b, and shot element 316. Another exemplary script document, including actual text of a script, is discussed and described in more detail with respect to FIG. 6A.

A scene heading (also referred to as a "slugline") includes a description of where the scene physically occurs. For example, a scene heading may indicate that the scene takes place indoors (e.g., INT.) or outdoors (e.g., EXT.), or possibly both indoors and outdoors (e.g., INT./EXT.) Typically, a location name follows the description of where the scene physically occurs. For example, "INT./EXT." may be immediately followed by a more detailed description of where the scene occurs. (e.g., INT. KITCHEN, INT. LIVING ROOM, EXT. BASEBALL STADIUM, INT. AIRPLANE, etc.). The scene heading may also include the time of day (e.g., NIGHT, DAY, DAWN, EVENING, etc.). This information embedded in the script helps to "set the scene." Scene headings are usually left aligned with a margin located about 1.5" from the left edge of the document. The scene heading is usually provided entirely in uppercase text and includes a blank line before and after the scene heading. The scene type is typically designated as internal (INT.) or external (EXT.), and includes a period following the INT or EXT designation. A hyphen is typically used between other elements of the scene heading. For example, a complete scene heading may read, "INT. FERRY TERMINAL BAR-DAY" or "EXT. MAROON MOVIE STUDIO-DAY".

An action element (also referred to as a description element) typically describes the setting of the scene and introduces the characters providing a setup for a scene. Action elements also describe what will actually happen during the scene. Action elements are usually left aligned, at a left margin with about 1.5" from the left edge of the document (e.g., aligned with the scene heading), and have text extending to a right margin located about 1.0" from the right edge of the document. Action elements typically use the full width of the line/text on the page and thus, the text is typically word wrapped (e.g., text is continued on a new line when a line is full, such that each line fits in the viewable window, allowing text to be read from top to bottom without any horizontal scrolling) to simplify editing and rewrites. Text of action elements is usually single-spaced and provided in a mixed case (e.g., a paragraph case including capitalization the first letter of each sentence and the first letter of proper nouns, and providing other letters in lower case). Further, where a speaking character is introduced for the first time, the text of the character's name is typically provided in all uppercase text within the action element.

A character name element may include an actual name (e.g., MS. SUTTER), description (e.g., BIG MAN) or occupation (e.g., BARTENDER) of a character. Sequence numbers are typically used to differentiate similar characters (e.g., COP #1 and COP #2). Character names are usually indented to a location about 3.5" from the left edge of the document. Character names are typically formatted in all uppercase letters. A character name is almost always inserted prior to a character speaking (e.g., just before dialog element), to indicate that the character's dialogue follows.

A dialog element indicates what a character says when anyone on screen or off screen speaks. This may include conversation between characters, when a character speaks out loud to themselves, or when a character is off-screen and only their voice is heard (e.g., in a narration). Dialog elements may also include voice-overs or narration when the speaker is on screen but is not actively speaking on screen. Dialog elements are usually indented to a location about 2.5" from the left edge of the document and are usually left aligned. Generally, a line of dialogue is between about thirty and thirty-five spaces/characters in length. The right margin of a dialog element is generally flexible, and is usually located at about 2.0" to 2.5" from the right edge of the document. Dialog elements are usually single-spaced and provided in a mixed case.

A parenthetical typically includes a remark that indicates an attitude in dialog delivery, and/or specifies a verbal direction or action direction for the actor who is speaking the part of a character. Parentheticals are typically short, concise and descriptive statements located under the characters name. Parentheticals are usually left indented to a location about 3.0" form the left edge of the document and include a right margin located at about 3.5" from the right edge of the document. Parentheticals are not necessarily centered under the character name, although they may be generally aligned under the character's name.

A transition typically includes a notation indicating an editing transition within the telling of a story. For example, "DISSOLVE TO:" means the action seems to blur and refocus into another scene, as generally used to denote a passage of time. A transition is usually indented to a location about 6.5" from the left edge of the document, and usually includes a right margin located at about 1.0" from the right edge of the document. Transitions are typically formatted in all uppercase. Transitions almost always follow an action element and precede a scene heading. Common transitions include: "DISSOLVE TO:", "CUT TO:", "SMASH CUT:", "QUICK CUT:", "FADE IN:", "FADE OUT:", and "FADE TO:".

A shot element typically indicates what the camera sees. For example, a shot element that recites "TRACKING SHOT" generally indicates the camera should follow a character as he walks in a scene. "WIDE SHOT" generally indicates that every character appears in the scene. Shots are often formatted similar to scene headings, flush with a left margin located at about 1.5" from the left edge of the document, in all uppercase, with a blank line before and after the shot element. A SHOT tells the reader the focal point within a scene has changed. Example of shot elements include: "ANGLE ON . . . ", "PAN TO . . . ", "EXTREME CLOSE UP . . . ", "FRANKIE'S POV . . . ", and "REVERSE ANGLE . . . ".

In some embodiments, method 200 includes extracting a layout-preserved document, as depicted at block 202. Extracting a layout-preserved document may include processing document 102 to generate layout preserved document 106. In some embodiments, a document extractor may implement an optical character recognition (OCR) routine, or a similar technique to extract data from the document such that the extracted data can be provided in a format suitable for use in a document analyzer. For example, OCR may be performed by document extractor 104 where an image (e.g., PDF, JPEG, TIFF, or BMP) of document 102 is provided that does not include character information capable of being processed by document analyzer 108. Moreover, a document extractor may implement one or more text extraction filters to obtain layout-preserved reading order text from document. For example, document extractor 104 may implement one or more routines to preserve information relating to the indentation, spacing, capitalization, and other layout features of document 102. Such a technique may ensure that formatting of the document is preserved for processing by document analyzer 108 (e.g., statistical module 112 and feature identification module 114) which may rely on the layout (e.g., location and format) of portions of document 102 to appropriately identify various elements of document 102. Embodiments of methods and apparatus for generating layout-preserved text output from PORTABLE DOCUMENT FORMAT (PDF) input may include techniques such as those described in U.S. patent application Ser. No. 12/471,814 entitled "Method and Apparatus for Generating Layout-Preserved Text" filed May 26, 2009 and having inventors Eunyee Koh and Walter Chang, the content of which is incorporated by reference herein in its entirety as if fully set forth herein. Other document to text extraction techniques may be used, such as XPDF, an open source PDF viewer. During extraction noise artifacts may be removed and rotation or alignment errors may be accounted for. Method 200 may include forwarding layout preserved document 106 to document analyzer 108 of document generator 107 for processing to generate structured/tagged document 122.

In some embodiments, layout preserved document 106 may be preprocessed to ensure it is provided in an appropriate format for processing by document generator 107. In certain embodiments, preprocessing may be provided after or in parallel with extracting layout-preserved document (block 204), and prior to performing statistical analysis of the document (block 206). In some embodiments, document generator 107 may provide for pre-processing of layout preserved document 106. For example, where layout preserved document 106 includes a type of script document (e.g., closed caption script document) not immediately suitable for subsequent processing, document generator 107 may include a pre-processing module that pre-processes the layout preserved document 106 (e.g., filters/extracts certain portions of document 106) such that the pre-processed document can be subsequently processed using the document generation techniques described herein. In some embodiments, pre-processing may be employed to format an existing script document (e.g., a closed caption script document, Hollywood shooting scripts, or the like) to a format that can be processed by document generator 107 (e.g., to a format similar to that of a traditional movie script).

In some embodiments, preprocessing may include extracting character/speaker markers in source text of the document. For example, in a closed captioned script document, identifying the names of persons speaking relative to the substantive text/symbols representing the spoken phrases that traditionally follow the speaker's name when displayed in closed captioning. In some embodiments, preprocessing may include extracting text runs of dialog or narrative that follow the speaker markers. For example, extracting the substantive text/symbols representing the spoken phrases that traditionally follow the speaker's name. In some embodiments, pre-processing may include filtering out annotations or markups within the text run of the respective dialog sections. For example, comments or descriptions typically included as bold or italicization tags may be removed or extracted. In some embodiments, preprocessing may include reformatting the extracted speaker identification and text run data into canonical spec. script format. In certain embodiments, the reformatted/pre-processed document may be similar to a spec. script, but may be missing certain elements, such as scene headings, scene and/or action descriptors, parentheticals, camera transition information, or the like. In some embodiments, the pre-processed document may, then, be processed in accordance with the techniques described herein. For example, the pre-processed document may be subsequently processed. For example, after pre-processing, the document may be subject to statistical analysis, feature matching, feature identification, processing by a FSM, tagging and the like.

In some embodiments, method 200 may include performing a statistical analysis, as depicted at block 206, and/or performing feature matching, as depicted at block 208. In the illustrated embodiment, statistical analysis is performed prior to performing feature matching. Such an embodiment may be of particular use where the results of statistical analysis aid in feature matching. For example, feature identification may rely on formatting statistics (e.g., indentation grouping of document elements) to match an element identification with a particular element identifier. However, other embodiments may include statistical analysis performed after or in parallel with feature matching. In some embodiments, statistical analysis or feature matching may not be performed.

Performing statistical analysis (block 206) may include building a statistical model of the document. For example, performing statistical analysis may include building a statistical model of text and line elements of layout-preserved document 106 based on the locations of margins/indentations, spacing, and the like. Such a statistical model may be used to determine grouping of lines associated with one or more elements based on the margins/indentations of each line. Statistical analysis may include generating an element offset distribution histogram by recording the first-left-most element of each line (e.g., the indentation location of the first character of each line). Each line may be identified with a most likely element identifier based on the lines indentation relative to other lines in the element offset distribution histogram. Due to screenwriter tendencies to stray from standard script formats (e.g., intentionally or unintentionally by inadvertently inserting extra spaces/tabs) there may be some variability in what a certain characteristic (e.g., indentation) means. However, within each script, screen writers tend to be self-consistent and conform to their own standards within the particular script document. For example, a screen writer who indents an action element by an additional 0.5" is likely to do so throughout the entire document such that the lines containing action elements may be grouped together in the element offset distribution histogram, thereby allowing the element identifier to be associated with the respective grouping. In some embodiments, grouping of lines having similar format may be identified by the statistical analysis, and subsequent feature matching and analysis by the FSM may be used to assign appropriate element identifiers to the grouping and/or sub-groups within the grouping. Based on experience reviewing numerous movie scripts, it may be expected that five groupings of lines may emerge from a script document based on indentation. These groupings may include (1) scene element, shot element, action element; (2) dialog; (3) parenthetical; (4) character; and (5) transition. Accordingly, a line grouped with group (1) is likely to be one of a scene element, a shot element, an action element, and additional processing (e.g., feature matching and/of FSM analysis) may be used to determine which of the three element types the line is associated with. A line grouped with groups (2), (3), (4), or (5) is likely a dialog, parenthetical, character or transition element, respectively, and, thus, each respective line (or grouping of lines) may be assigned to a dialog element type without much or any additional processing (e.g., additional processing may be used to verify the element type).

In some embodiments, a score may be assigned to each line based on the confidence of which each line represents. In the case of a line associated with group associated with a larger number of elements (e.g., group 1 associated with three element types), a moderate confidence score may be assigned to the associated elements, although the confidence score may be higher than the elements not associated with the grouping (e.g., scene=20%, shot=20%, action=20%, dialog=5%, parenthetical=5%, character=5%, transition=5%). In the case of a line associated with group associated with lesser numbers of elements (e.g., group 2 associated with a single element), a high confidence score may be assigned to the associated element, with lower scores for elements not associated with the grouping (e.g., scene=3%, shot=3%, action=3%, dialog=80%, parenthetical=3%, character=3%, transition=3%).

A score may also be adjusted based on characteristics relative to other grouping. For example, scoring may be higher for grouping having similar indentation features, and lower for grouping having indentation features that are not similar. It will be appreciated that the confidence scores may be expressed in any variety of forms that are indicative of a level of confidence. In certain embodiments, the confidence level scores are interpreted relative to one another, and in the case of percentages, do not necessarily have to add up to 100%.

To find the emerging points (1, 2, 3, 4, 5) for any given input script, a local line count maxima for each indention count for each position within the script file for each line of text may be determined using the following:

$$MarginCount(Position(i)) = \sum_{j=1}^{N} MarginScore(i, j) \quad (1)$$

where: N=number of spec. script lines; Position(i)=the i'th column position within a line; and MarginScore(i,j)=1, if Left-Most-Margin(Line[j]) i; else 0

Using equation (1), if a screenwriter even conforms loosely to script formatting guidelines, a script element offset distribution can be detected. For the full distribution, equation (1) must be computed for each of the 1 . . . N script file lines.

Further, all values which fall outside of the cluster offset maximums may be rounded to their nearest cluster maximum. In the case where values are equidistant to cluster maximums (which is possible but highly unlikely), round up. Even if this rounding is incorrect in the rare case it occurs, the FSM processing may provide the final determination/verification as to the script element type.

Figure 4A:
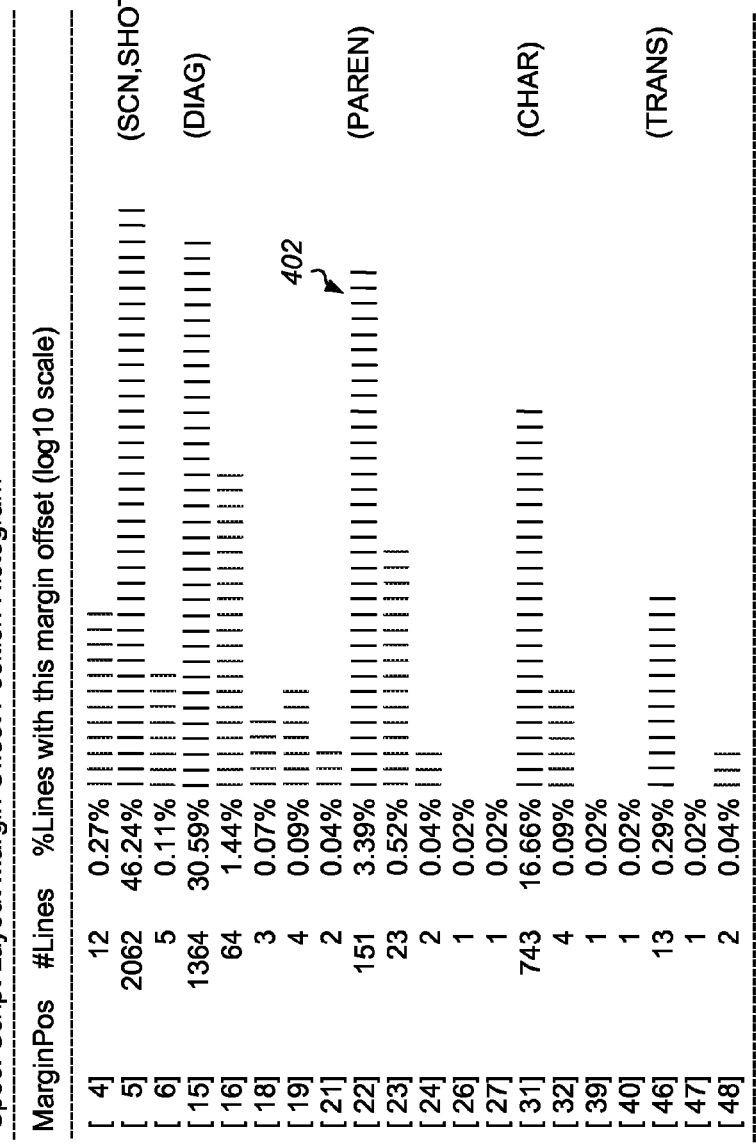

FIG. 4A illustrates an exemplary histogram chart 400 in accordance with one or more embodiments of the preset technique. Histogram chart 400 includes a layout margin offset position histogram for a script using the above described technique. Histogram 400 includes graphical representations 402 of the number of lines having a given margin position (e.g., spaces/distances from the left edge of the document or the left margin). For example "2062" lines are identified having a margin position of "5" and a number of tick marks extend to the right, forming a bar graph, indicative of the number of lines having that margin position relative to the number of lines at other margin positions. In certain embodiments, the chart may be scaled accordingly to accommodate the amount of data. For example, in some embodiments, the "X-axis" of histogram chart 400 may include a logarithmic (log base-10) scale to accommodate large count values (e.g., number of lines) for respective features (e.g., respective margin positions).

In the illustrated embodiment, likely element identifiers 404 are listed in association with the margin position they are most likely associated with. For example, the label "(SCN, SHOT, ACTION)" is provided proximate the portion of the histogram indicative of the "2062" lines having a margin position of "5". In the illustrated embodiment, additional statistical information provided includes the number of lines ("nLines"), the breakdown of the number of scene types (e.g., EXT=29, INT=36, INT/EXT=0), and the number of various elements (e.g., ActionRefs=1811 . . . ). FIG. 4B illustrates an exemplary chart 410 including additional information that may be provided as a result of the statistical analysis. FIG. 4B includes identifications of the number and breakdown of scene type and other elements types, as well as warnings relating to various elements. For example, a warning is posted for one of the character names, stating that there is mixed case (e.g., where all upper case was expected based on typical character name formatting). Such a warning may be forwarded to subsequent processing in the form of an explicit request to verify the element, and/or a reduction in the confidence score associated with the document element that provokes the warning. Similar warnings may be provided where layout is indicative of an element type, however, the actual text conflicts with the indicated element type.

In the illustrated embodiment, histogram 400 indicates the strongest offset clusters formed around margin positions of five, fifteen, twenty-two, thirty-one and forty-six. Weaker offsets occur around margin positions at four, six, sixteen, eighteen, nineteen, twenty-one, twenty-three, twenty-four, twenty-six, twenty-seven, thirty-two, thirty-nine, forty, forty-seven and forty-eight. The weaker offsets may be grouped with the strongest offsets based on the respective margin position of each of the weaker offsets to the margin position of the strongest offsets. For example, offsets at four and six may be grouped with the offset at five (e.g., grouping of margin positions 4, 5, 6), offsets at sixteen and eighteen may be grouped with the offset at fifteen (e.g., grouping of margin positions 15, 16, 18), offsets at nineteen, twenty-one, twenty-three, twenty-four, and twenty-six may be grouped with the offset at twenty-two (e.g., grouping of margin positions 19, 21, 22, 23, 24, 26), offsets at twenty-seven and thirty-two, may be grouped with the offset at thirty-one (e.g., grouping of margin positions 27, 31, 32), and offsets at thirty-nine, forty, forty-seven and forty-eight may be grouped with the offset at forty-six (e.g., grouping of margin positions 39, 40, 46, 47, 48). Such a technique may be used to provide a preliminary assessment of element identifiers to lines of the script document. The element identifiers from the preliminary assessment may be used as an input/starting point for subsequent processing and the extraction of all valid script element sequences. For example, the element identifiers may be combined with or used as a basis for feature identification of block 210.

In some embodiments, performing feature matching (block 208) includes comparing portions of the document with typical characteristics associated with particular document element types, and assigning a document element type to the respective portion of the document having characteristics/features similar to the known characteristics. For example, feature matching may include matching known characteristics of particular document element types to characteristics found in one or more lines of the document, and assigning the matching document element type to the respective one or more lines of the document.

In some embodiments, feature matching includes matching a word or phrase to a word/phrase/symbol found in a line of the document. For example, where feature identification module 114 locates the term "INT" in a script document, feature identification module may assign a scene heading element identifier/tag to the line including the term "INT". In some embodiments, words/phrases/symbols may be stored in a predetermined look-up table (LUT). For example, a LUT for script documents may include a plurality of words/phrases/symbols commonly used in scripts. In some embodiments, matching may include pattern matching one or more words/phrases/symbols and/or a particular sequence of words/phrases/symbols. For example, where feature identification module 114 locates the term "INT" in combination with a period following the term ("INT.") in a script document, feature matching module 114 may assign a scene heading element identifier/tag to the line including the phrase "INT.". In some embodiments, a parenthetical may be identified by matching the parenthesis located around the text. In some embodiments, feature matching may include identifying a feature based on a format of the text. For example, a short word including all uppercase letters may be matched with a character name element type/identifier. In some embodiments, feature identification may assign an element identifier to all or less than all of the lines of a document. For example, in some embodiments, lines may not be assigned an element identifier if no match is found in the line. This may occur where the line does not include a word/phrase/symbol stored in a LUT.

In some embodiments, a score may be associated with assigned identifiers. Higher scores may be assigned to matches that include a greater number of elements, as it may indicate a higher probability that the assigned identifier is correct. For example, finding only the terms "INT" may be assigned a confidence score 90%, whereas the matching of a phrase "INT." (including the period) may be assigned a confidence score of 98%.

In some embodiments, method 200 may include performing feature identification, as depicted at block 210. Feature identification may include document analyzer assigning an element identifier to some, substantially all, or all of the lines of a document. In some embodiments, feature identification assigns an element identifier based on the results from one or both of the statistical analysis (block 206) and feature matching (block 208). For example, feature identification may include identifying which lines have been assigned an element identifier by feature matching module 114, identifying groupings of lines associated with one another by statistical analysis module 112, and may assign the element identifiers assigned to a particular line by matching module 114 to each of the other lines in the group associated with the particular line as identified by statistical analysis module 112. In some embodiments, where a conflict exists between two or more previously assigned element identifier for a particular line or grouping of lines, feature identification may include determining and assigning the most likely element identifier to a line or a group of lines. For example, where statistical analysis indicates that a line includes a dialog element with a confidence score of 10%, but the matching module indicates that a line includes an action element with a score of 90%, feature identification may assign a scene heading to the line and/or an associated grouping of line. The assignment of element identifiers to each line may be referred to as "tokenizing" the line. Accordingly, the combination of statistical analysis, feature matching, and/or element identification may be referred to as "tokenizing" the document.

In some embodiments, lines and their associated element identifiers determined during feature identification are assembled into an initial set of structured/tagged information (e.g., parsed information 110) that includes an element identifier assigned to some, substantially all, or all of the lines of the document. Parsed information 110 may be passed to a FSM module (e.g., FMS 116) for further processing.

In some embodiments, method 200 may include passing identified document elements through a FSM, as depicted at block 212. For example, parsed information 110 may be passed to FSM 116, and FSM 116 may analyze the sequence of the identified elements in parsed information 110 to assess/determine/verify element identifiers assigned to the lines/elements by the tokenization. In some embodiments, FSM 116 includes a model of expected transitions between elements (e.g., states) of a document. FSM 116, thus, may reflect and expected flow in a script document that includes transitions from one script element to the next.

Figure 5:
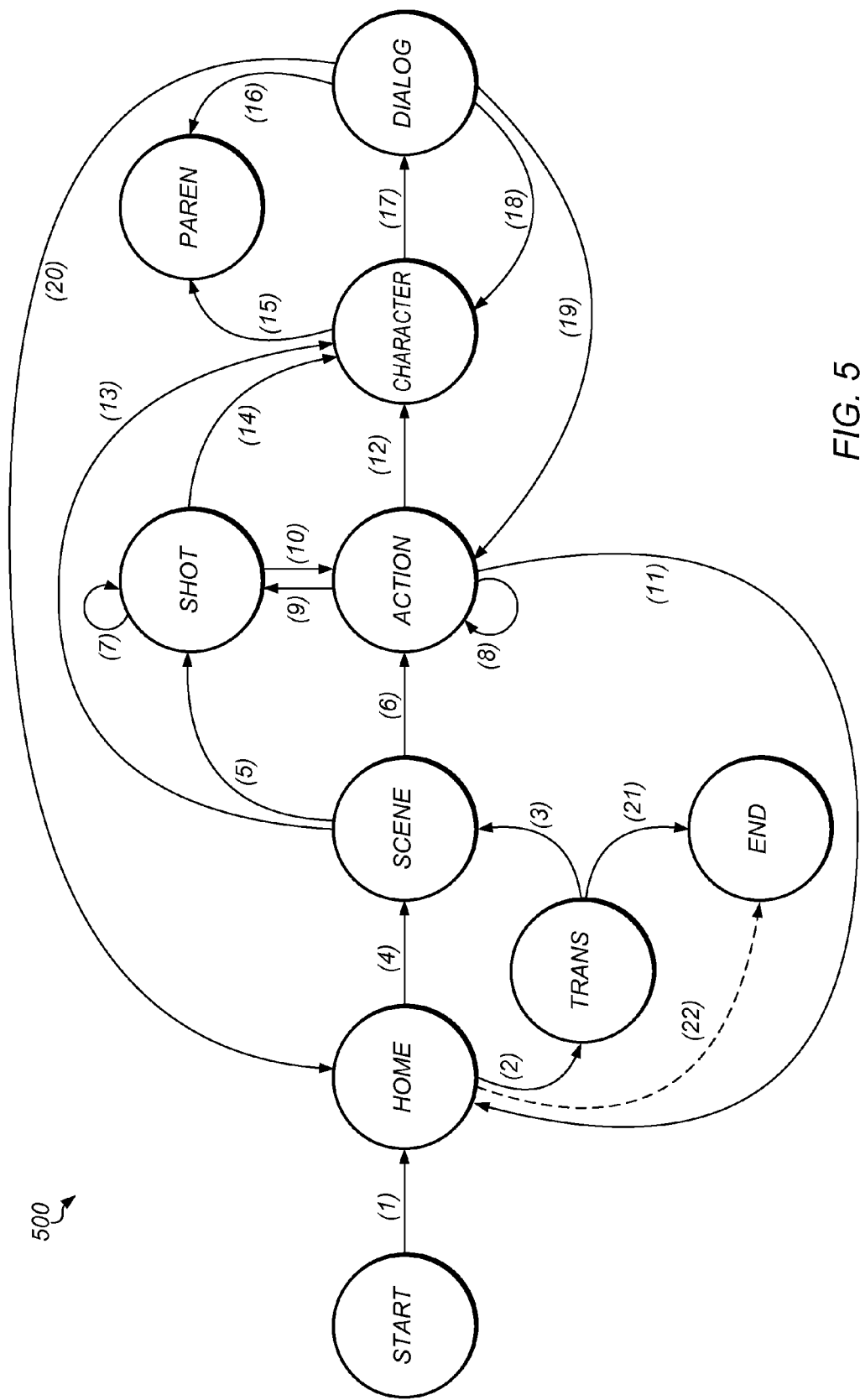
FIG. 5 is a flow diagram illustrating an example embodiment of operating a finite state machine in accordance with one or more embodiments of the present technique.

FIG. 5 is a flow diagram 500 illustrating an embodiment of operation a FSM (e.g., FSM 116) in accordance with one or more embodiments of the present technique. In the illustrated embodiment, flow diagram 500 depicts operation of an FSM for a script document, although a FSM may include any variety of flow information based on the expected flow of the document to be processed. Each circle indicates an element states (e.g., START, HOME, TRANS . . . ). Each of the states corresponds to a script element. The START state is an initial entry point into the FSM and the END state is the final element captures (typically the element "THE END"). Arrows from one state to another indicate a transition and represent the progression to one or more of the next elements expected to be captured. FSM defines the allowable sequence of script elements that are encountered in a typical script document.

Table I illustrates an element transition table that provides a listing of the illustrated transitions along with a description of the expected characteristics of the transition:

TABLE I

| Transition # | State/Comment |
| --- | --- |
| (1) | Attribution and preamble to HOME STATE |
| (2) | Optional to 1st TRANSITION STATE |
| (3) | Expect 1st SCENE STATE |
| (4) | Go to 1st SCENE STATE |
| (5) | Optional SHOT STATE before Action or Char. |
| (6) | Transition to ACTION STATE with Scene setup |
| (7) | Zero or more SHOTs for each Scene |
| (8) | Zero or more ACTIONs for each Scene |
| (9) | Zero or more SHOT STATEs may follow an ACTION STATE |
| (10) | SHOTs may be interspersed between Actions |
| (11) | SCENEs may end after Action element |
| (12) | Action to CHARACTER STATE |
| (13) | Scene to CHARACTER STATE (No Action State) |
| (14) | Shot to CHARACTER STATE |
| (15) | Optional Char. PARENTHETICAL STATE |
| (16) | Optional Paren. State to DIALOG STATE |
| (17) | Char. To DIALOG STATE |
| (18) | Zero or more CHARACTER-PAREN-DIALOG consecutive sequences |
| (19) | Zero or more Action and Shot States may be occur between CHARACTER STATEs |
| (20) | DIALOG STATE can transition to new SCENE STATE or new TRANSITION STATE |
| (21) | Final Transition before END STATE |
| (22) | Transition from HOME STATE to END STATE (w.o. Transition) |

In some embodiments, method 200 includes determining whether or not incorrectly identified document elements remain, as depicted at block 216. In some embodiments, FSM 116 may assess/determine/verify an element identifier assigned to a particular line/element based the state machine expected flow (e.g., diagram 500) and one or more of the element identifiers assigned to lines/elements preceding and/or following the particular line/element. In other words, FSM 116 may process the context of a line/element using a state machine to assess whether or not the element identifier of parsed document 110 is correct, or appears to be incorrect based on its position relative to other identifier elements. For example, a "DIALOG" element immediately after a "CHARACTER" element is likely correct and is verified, whereas a "DIALOG" element immediately after a "SCENE" heading is likely incorrect and may be flagged to be reassessed. FSM 116 may implement assessment for each line/element to determine which elements in parsed document 110 are accurate. In some embodiments, FSM 116 may confirm the element identifier assigned in parsed document 110, may determine that certain element identifiers might be incorrect and may need to be reassessed, or determine that an element identifier is incorrect/inaccurate and change/reassign the element identifier unilaterally (e.g., where there is only one option for the element type).

In some embodiments, if it is determined that an (or at least a sufficient number of) incorrectly identified document elements remain, some, substantially all, or all of the identified elements may be returned upstream processing to perform additional processing of the features, as indicated by the arrow extending from block 214 to block 210. For example, where FSM 116 determines that one or more identifiers need to be reassessed, FSM 116 may forward parsed/revised information 120 to document analyzer for additional processing. Where FSM 116 determines that an element identifier is in incorrect/inaccurate, FSM 116 may assign an accurate element identifier to the respective line/element and/or may forward parsed/revised information 120 to document analyzer 108 for additional processing. In some embodiments, the elements identifiers may be returned for additional statistical analysis and/or feature matching. For example, where statistical analysis is static (e.g., does not change based on subsequent processing), parsed revised document 120 may be returned only to feature matching module 114 of document analyzer 108, such that feature matching and/or feature identification are performed. In such an embodiment, method 200 may include an arrow extending from block 214 to block 208. Cycling through FSM 116 and Document Analyzer 108 may be repeated for one or more iterations and/or until it is determined that each (or at least a sufficient number) of the assigned element identifiers is accurate/correct. Accordingly, a structured document that includes at least a sequential listing of the element identifiers in association with their relative locations in the layout of document 102 may pass through multiple iterations until each of the element identifiers is accurate/correct/verified.

In some embodiments, method 200 includes providing (e.g., generating, storing, displaying) structured/tagged document 216, as depicted at block 216. For example, once processing of layout preserved document 106 by document generator 107 is complete, a structured/tagged document 122 may be generated. Structured/tagged document 122 may include a sequential listing of the lines of the document in accordance with their order in document 102 along with a tag (e.g., tags—"TRAN", "SCEN", "ACTN", "CHAR", "DIAG", "PARN" or the like) identifying a determined element type associated with some, substantially all, or all of each of the lines or groupings of the lines. In some embodiments, structured/tagged document may include an Extensible Markup Language (XML) format. As discussed in more detail below with respect to FIG. 8, structured/tagged document 122 may include a sequential listing of the lines of the document in accordance with their order in document 102 along with a tag identifying a determined element type associated with some, substantially all, or all of each of the lines. Structured/tagged document 122 may be stored on a storage medium 124. For example, structured/tagged document 122 may be provided to a script metadata database. In some embodiments, structured/tagged document 122 may be provided to a display device 126 for presentation to a user. For example, a visual representation of structured/tagged document 122 may be displayed on a graphical display (e.g., a monitor) of a computer system. In some embodiments, structured/tagged document 122 may be provided to one or more other modules 128 for additional processing. For example, structured/tagged document 122 may be processed such that the metadata contained in structured/tagged document 122

(e.g., the element identifiers) can be matched/associated with portions of other documents and files. In some embodiments, metadata of structured/tagged document 122 may be extracted such that element identifiers are time-aligned with corresponding video based on the script such that dialog text within the script is synchronized to the audio dialog portion of the video content. In some embodiments, time alignment may be accomplished via software, such as Premiere Pro by ADOBE Systems.

FIGS. 6 and 7A-7B illustrate portions of an exemplary script document and corresponding portions of structure/tagged documents that may be generated via processing of the exemplary script document in accordance with the techniques described herein. FIG. 6 illustrates an exemplary script document 102*b* in accordance with one or more embodiments of the present technique. Exemplary script document 102*b* depicts an exemplary layout of the above described script elements. For example, exemplary script document 102*b* includes a transition element 304, a scene heading element 306, action elements 308*a*-308*e*, character name elements 310*a*-310*h*, and dialog elements 312*a*-312*i*.

FIG. 7A illustrates at least a portion of an exemplary structured/tagged document information 122*a* in accordance with one or more embodiments of the present technique. Exemplary script document information 122*a* may be indicative of a structured tagged document provided in response processing of exemplary/source script document 102*b* of FIG. 6 in accordance with techniques described with regard to system 100 and method 200. Exemplary structured tagged document information 122*a* includes a sequential listing of lines of exemplary script 102*b*. The lines of tagged/structured document information 122*a* area arranged in the same order as the lines were presented in the exemplary script document 102*b*. Each line includes a line number identifier 600*a*. Line number 600*a* may correspond to the associated line position in the source script document 102*b*. Each line includes an element identifier (e.g., tag) 602*a*. Tags 602*a* may correspond to the element identifier assigned to the respective line during processing. Each line also includes a listing of text 604*a* provided in brackets. Listing of text 604*a* may include the text of the corresponding line of the source script document 102*b*. For example, action element 308*a* of FIG. 6 is represented in FIG. 7A by line numbers "00012" and "00013" associated with "ACTN" tags (e.g., action element identifier), and the corresponding bracketed text "JUSTIN SUTTER, 18, lies sideways and comatose in bed at well" and "past ten in the morning." In the illustrated embodiment, each line of text of exemplary script document 102*b* of FIG. 6 is broken into their original line arrangement (e.g., the text of lines 12 and 13 of script document 102*b* of FIG. 6 are represented by separate lines, [00012] and [00013], of information 122*a* in FIG. 7A). Information 122*a* also includes a header 606*a*. Header 606*a* may include additional information, such as the extracted title, as well as other information regarding processing of the script document. A corresponding structured/tagged document 122 may include tagged/structured document information 122*a* of FIG. 7A and/or 122*b* of FIG. 7B. Where the length of the source script requires, a second page of similar information may continue with additional tagged lines arranged in accordance with the subsequent lines of a source document. In some embodiments, structured/tagged document may include an Extensible Markup Language (XML) format, such as *.ASTX format used by certain products produced by ADOBE Systems.

FIG. 7B illustrates at least a portion of an exemplary structured/tagged document information 122*b* provided in an Extensible Markup Language (XML) format in accordance with one or more embodiments of the present technique. Exemplary script document information 122*b* may be indicative of a structured tagged document provided in response processing of exemplary/source script document 102*b* of FIG. 6 in accordance with techniques described with regard to system 100 and method 200. Exemplary structured tagged document 122*b* includes a sequential listing of script elements of exemplary script 102*b* of FIG. 6. The identified elements of tagged/structured document 122*b* area arranged in the same order as the elements were presented in the exemplary script document 102*b* of FIG. 6. Each line includes a numerical identifier 600*b*. Numerical identifier 600*b* may correspond to the associated position of the respective element in the source script document 102*b* of FIG. 6. For example, in the illustrated embodiment, items "1:9" and "1:10" are associated with the respective action element. Each element includes an element identifier (tag) 602*b*. Tags 602*b* may correspond to the element identifier assigned to the respective element during processing. Each element also includes a listing of text 604*b* associated with each element. Listing of text 604*b* may include the text of the corresponding line of the source script document 102*b*. For example, tag 602*b* includes an "Action" tag associated with the numerical identifier "1:9" and the associated text ("JUSTIN SUTTER, 18, lies sideways and comatose in bed at well past ten in the morning") for the action element follows to the right of numerical identifier "1:10". In the illustrated embodiment, several lines of text of exemplary script document 102*b* may be combined into element descriptors that are not necessarily broken into their original line arrangement (e.g., the text of lines 12 and 13 of script document 102*b* are represented in a single line of information 122*b*). Information 122*b* also includes a header 606*b*. Header 606*b* may include additional information, such as the extracted title, as well as other information regarding processing of the script document. A corresponding structured/tagged document 122 may include tagged/structured document information 122*b*.

In some embodiments, processing may be performed in parallel on one or more documents. For example, where multiple processors are implemented, at least a portion of the processing for one or more documents may be performed simultaneously on two or more processors. In some embodiments, a single complete a source script document may initially be processed (e.g., at document analyzer 108) to determine indentation offsets for various script elements. Subsequent to the initial processing, the script document may be divided into smaller segments that are processed separately (e.g., in parallel). Before separate (e.g., parallel) processing is done, the source script document may be intelligently segmented into N parts (e.g., substantially equal parts), where N is the number of processors available for processing. Intelligent segmenting may require that logical script elements are not broken between segments and that character/dialog elements are preserved (e.g., that a segment does not start or stop in the middle of the dialog element). A simple heuristic may be used to segment the script using scene heading boundaries, for example. Once segmented, each segment may be submitted separately for additional processing (e.g., feature matching, FSM processing, etc.) and can be merged together to provide a structured/tagged document output while preserving the original line numbering.

In some embodiments, documents being processed in parallel may share certain information. For example, two or more processing running in parallel may share a look up table (LUT) or generated metadata. For example, if processing several scripts from a single television series at once, a shared lookup table of character names may be used for identifying and tagging respective character name elements within the documents.

Exemplary Computer System

Figure 8:
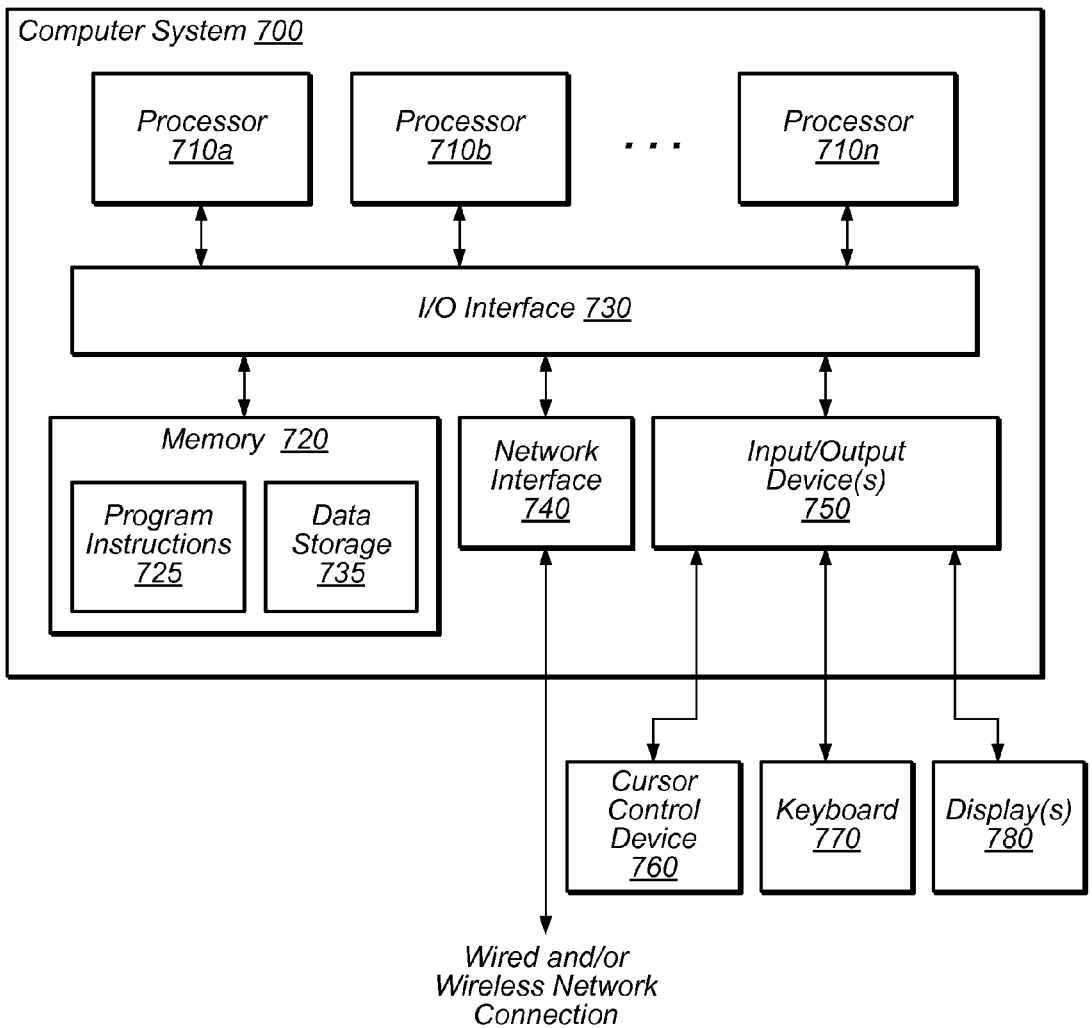
FIG. 8 is a block diagram that illustrates an example computer system in accordance with one or more embodiments of the present technique.

Various components of embodiments of a document element identification/extraction technique as described herein may be executed on one or more computer systems, which may interact with various other devices. One such computer system is illustrated by FIG. 8. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for layout-preserved text generation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a layout-preserved text generation method, are shown stored within system memory 720 as program instructions 725 and data storage 735, respectively.

In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 8, memory 720 may include program instructions 725, configured to implement embodiments of a layout-preserved text generation method as described herein, and data storage 735, comprising various data accessible by program instructions 725. In one embodiment, program instructions 725 may include software elements of a layout-preserved text generation method illustrated in the above Figures. Data storage 735 may include data that may be used in embodiments, for example input PDF documents or output layout-preserved text documents. In other embodiments, other or different software elements and/or data may be included.

Those skilled in the art will appreciate that computer system 700 is merely illustrative and is not intended to limit the scope of a layout-preserved text generation method as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be to the above technique made as would be obvious to a person skilled in the art having the benefit of this disclosure. For example, although several embodiments are discussed with regard to script documents, the techniques described herein may be applied to any variety of documents including elements identifiable by one or more of the techniques described herein. It is intended that the invention embrace all such modifications and changes and, accordingly, the above description to be regarded in an illustrative rather than a restrictive sense.

ADOBE and ADOBE PDF are either registered trademarks or trademarks of ADOBE Systems Incorporated in the United States and other countries.

What is claimed is:

1. A computer-implemented method, comprising:
   obtaining a script document comprising script elements;
   assessing a layout of the script document, the layout comprising a physical location of the script elements within the script document;
   determining a preliminary identification of a plurality of the script elements based at least in part on the physical location of the script elements within the script document, the preliminary identification indicating for each respective script element a type of script element from among a plurality of different types of script elements; and
   assessing the plurality of the script elements using a finite state machine to determine an accuracy of the preliminary identification, the finite state machine comprising a predefined model having a predefined plurality of states each representing a different script element identifier for a different one of the plurality of different types of script elements, and the predefined model being configured to specify a predefined plurality of allowed transitions between the states such that the model defines which of the plurality of different types of script elements are allowed to immediately precede each particular type of script element and which of the plurality of different types of script elements are allowed to immediately follow each particular type of script element in the script document, the plurality of the script elements being assessed by at least:
   applying the finite state machine to a sequence of the plurality of script elements of the script document to determine whether the sequence of the plurality of script elements follows the allowed transitions defined in the finite state machine; and
   for one or more of the plurality of the script elements determined to not follow the allowed transitions defined in the finite state machine, indicating that the preliminary identification of the script element is incorrect or changing the preliminary identification of the script element.

2. The method of claim 1, wherein the script elements comprise one or more of a title, a scene heading, an action element, a character name, a dialog element, a parenthetical, a transition, and a shot element.

3. The method of claim 1, wherein said assessing a layout of the script document comprises performing a statistical analysis of the layout of the script document, and wherein determining a preliminary identification of the plurality of script elements comprises using results of the statistical analysis to identify one or more of the script elements based on statistical groupings of the one or more script elements according to relative physical locations of the one or more script elements within the script document.

4. The method of claim 3, wherein said performing a statistical analysis comprises generating a histogram indicative of the physical locations of the one or more script elements relative to other portions of the script document, wherein the histogram comprises counts of elements in the script document at a plurality of respective physical locations in the script document.

5. The method of claim 3, wherein the statistical analysis comprises an indication of an indentation of each respective script element, and wherein determining a preliminary identification of the plurality of the script elements comprises grouping the script elements based on the indentation of the script elements from a margin of the script document.

6. The method of claim 3, wherein said using the results of the statistical analysis to identify the one or more of the script elements comprises grouping one or more script elements having similar physical locations within the script document.

7. The method of claim 1, wherein said determining a preliminary identification of the plurality of the script elements comprises matching one or more features of the script elements to one or more predetermined features, wherein each predetermined feature is indicative of a particular one of the plurality of different types of script elements.

8. The method of claim 7, wherein said matching comprises matching one or more words of the script elements to a predetermined set of words that are each indicative of a particular one of the plurality of different types of script elements.

9. The method of claim 7, wherein said matching comprises matching capitalization of one or more words of the script elements to a predetermined capitalization that is indicative of a particular one of the plurality of different types of script elements.

10. The method of claim 7, wherein said matching comprises matching one or more characters or symbols of the script elements to a predetermined set of characters or symbols that are each indicative of a particular one of the plurality of different types of script elements.

11. The method of claim 7, wherein said matching comprises matching one or more sequences of words, characters, or symbols of the script elements to a predetermined set of sequences of words, characters, or symbols, wherein each sequence is indicative of a particular one of the plurality of different types of script elements.

12. The method of claim 1, wherein said determining a preliminary identification of the plurality of the script elements comprises:
  scoring each of a plurality of script element identifiers for a respective script element using a plurality of identification techniques, wherein the plurality of identification techniques comprises:
    a statistical model of physical positions of script elements within the script document, wherein the statistical model indicates script element identifiers based on relative physical positions of script elements within the script document; and
    feature matching of one or more features of the respective script element to known script element features for each of the plurality of script element identifiers;
  wherein said scoring comprises generating a separate score for each identification technique; and
  in response to a conflict between the plurality of identification techniques as to a correct script element identifier for the respective script element based on said scoring, assigning the script element identifier from one of the plurality of identification techniques having a highest score as the preliminary identification for the respective script element.

13. The method of claim 1, further comprising:
  determining an identification for each of the plurality of the script elements; and
  generating a structured script document comprising each of the plurality of the script elements in association with a respective tag, wherein each respective tag comprises the respective determined identification.

14. The method of claim 1, in response to determining that a preliminary identification of one or more of the script elements is incorrect according to the finite state machine, then for a script element having the incorrect identification and one or more other script elements immediately surrounding the script element having the incorrect identification, repeating said determining a preliminary identification of the element and said assessing the element using a finite state machine.

15. A non-transitory computer-readable medium comprising program instructions stored thereon, the program instructions being computer-executable to perform operations comprising:
  obtaining a script document comprising script elements;
  assessing a layout of the script document, the layout comprising a physical location of the script elements within the script document;
  determining a preliminary identification of a plurality of the script elements based at least in part on the physical location of the script elements within the script document, the preliminary identification indicating for each respective script element a type of script element from among a plurality of different types of script elements; and
  assessing the plurality of the script elements using a finite state machine to determine an accuracy of the preliminary identification, the finite state machine comprising a predefined model having a predefined plurality of states that each represent a different script element identifier for a different one of the plurality of different types of script elements, and the model configured to specify a predefined plurality of allowed transitions between the states such that the model defines which of the plurality of different types of script elements are allowed to immediately precede each particular type of script element and which of the plurality of different types of script elements are allowed to immediately follow each particular type of script element in a script document, the plurality of the script elements being assessed by at least:
    applying the finite state machine to a sequence of the script elements of the script document to determine whether the sequence of script elements follows the allowed transitions defined in the finite state machine; and
    for one or more of the plurality of the script elements determined to not follow the allowed transitions defined in the finite state machine, indicating that the preliminary identification of the script element is incorrect or changing the preliminary identification of the script element.

16. The non-transitory computer-readable medium of claim 15, wherein said assessing a layout of the script document comprises performing a statistical analysis of the layout of the script document, and wherein determining a preliminary identification of the plurality of the script elements comprises using results of the statistical analysis to identify one or more of the script elements based on statistical groupings of the one or more script elements according to relative physical locations of the one or more script elements within the script document.

17. The non-transitory computer-readable medium of claim 15, wherein said determining a preliminary identification of the plurality of the script elements comprises matching one or more features of the script elements to one or more predetermined features, wherein each predetermined feature is indicative of a particular one of the plurality of different types of script elements.

18. The non-transitory computer-readable medium of claim 15, wherein the operations further comprise:
- determining an identification for each of the plurality of the script elements; and
- generating a structured script document comprising each of the plurality of the script elements in association with a respective tag, wherein each respective tag comprises the respective determined identification.

19. A computing device, comprising:
- one or more processors; and
- memory storing instructions that, responsive to execution by the one or more processors, cause the one or more processors to perform operations comprising:
   - obtaining a script document comprising script elements;
   - assessing a layout of the script document, the layout comprising a physical location of the script elements within the script document;
   - determining a preliminary identification of a plurality of the script elements based at least in part on the physical location of the script elements within the script document, the preliminary identification indicating for each respective script element a type of script element from among a plurality of different types of script elements; and
   - assessing the plurality of the script elements using a finite state machine to determine an accuracy of the preliminary identification, the finite state machine comprising a predefined model having a predefined plurality of states that each represent a different script element identifier for a different one of the plurality of different types of script elements, and the model being configured to specify a predefined plurality of allowed transitions between the states such that the model defines which of the plurality of different types of script elements are allowed to immediately precede each particular type of script element and which of the plurality of different types of script elements are allowed to immediately follow each particular type of script element in the script document, the plurality of the script elements being assessed by at least:
      - applying the finite state machine to a sequence of the preliminarily identified script elements of the script document to determine whether the sequence of preliminarily identified script elements follows the allowed transitions defined in the finite state machine; and
      - for one or more of the plurality of the script elements determined to not follow the allowed transitions defined in the finite state machine, indicating that the preliminary identification of the script element is incorrect or changing the preliminary identification of the script element.

20. The computing device of claim 19, wherein the operations further comprise:
- determining an identification for each of the plurality of the script elements; and
- generating a structured document comprising each of the plurality of the script elements in association with a respective tag, wherein each respective tag comprises the respective determined identification.

* * * * *